United States Patent

Chow

[15] 3,672,632
[45] June 27, 1972

[54] SWING OUT VALVE STRUCTURE

[72] Inventor: Peter C. M. Chow, San Jose, Calif.
[73] Assignee: Grove Valve and Regulator Co., Oakland, Calif.
[22] Filed: May 3, 1971
[21] Appl. No.: 139,415

[52] U.S. Cl. ............................251/151, 137/454.2, 285/31
[51] Int. Cl. ...................................F16k 51/00, F16l 23/00
[58] Field of Search....................251/5, 151, 152, 148, 315, 251/317, 192, 219, 220, 221, 222; 137/454.2; 285/31, 18

[56] References Cited

UNITED STATES PATENTS

| | | | |
|---|---|---|---|
| 1,211,500 | 1/1917 | Strong | 285/31 X |
| 3,356,337 | 12/1967 | Olen | 251/317 X |
| 3,371,677 | 3/1968 | Connolly | 251/5 X |
| 3,424,430 | 1/1969 | Hoelsch | 251/148 |

*Primary Examiner*—William R. Cline
*Attorney*—Melvin R. Stidham

[57] ABSTRACT

A valve structure comprising a swing-out body which is clamped between line flange connector plates by means of elongated studs with clamping nuts. Those studs which are located on, and on one side of, a diameter of the flow passages are provided with jacking nuts which may be tightened to engage the inside of the connector plates and separate them out of clamping engagement with the swing out body. A pair of hinge members welded to the swing out body have circular openings therein which rotatably receive bushings threadedably carried on one of the studs located on the aforementioned diameter. The studs without jacking nuts may be completely removed and the valve body may be pivoted out for internal inspection. Lateral slots in the hinge members permit removal of the valve body from the stud when the bushings are threaded back out of the circular openings in the hinges.

5 Claims, 10 Drawing Figures

INVENTOR
PETER C. M. CHOW

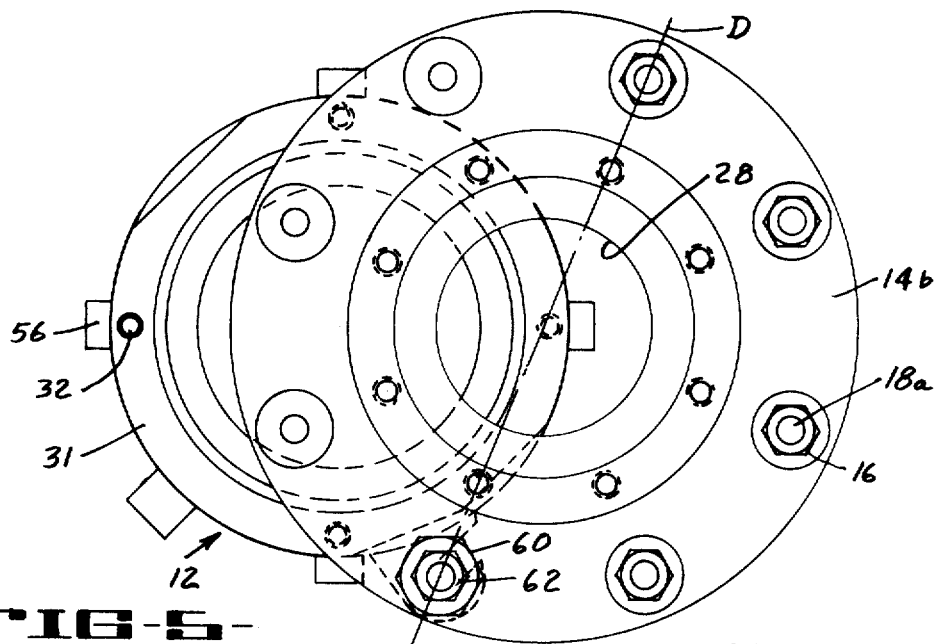
FIG-5-
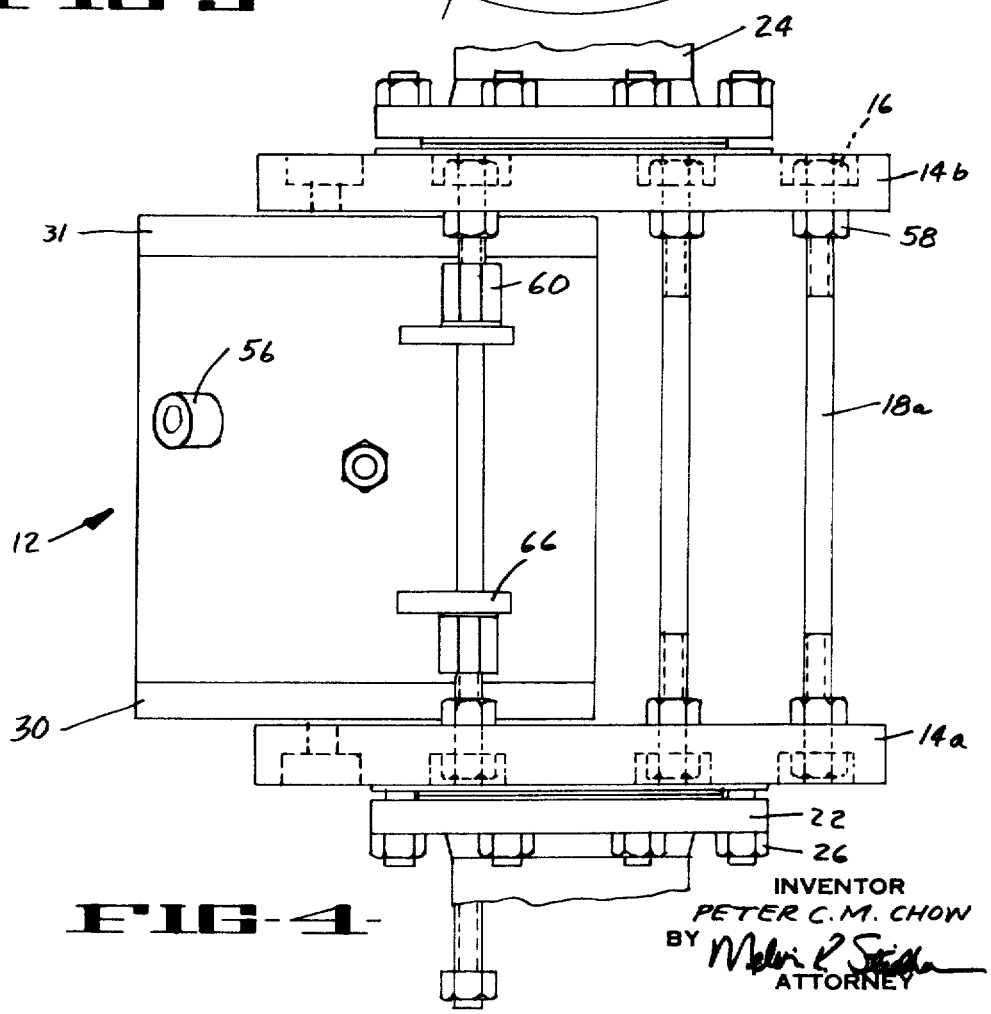
FIG-4-
INVENTOR
PETER C.M. CHOW
BY
ATTORNEY

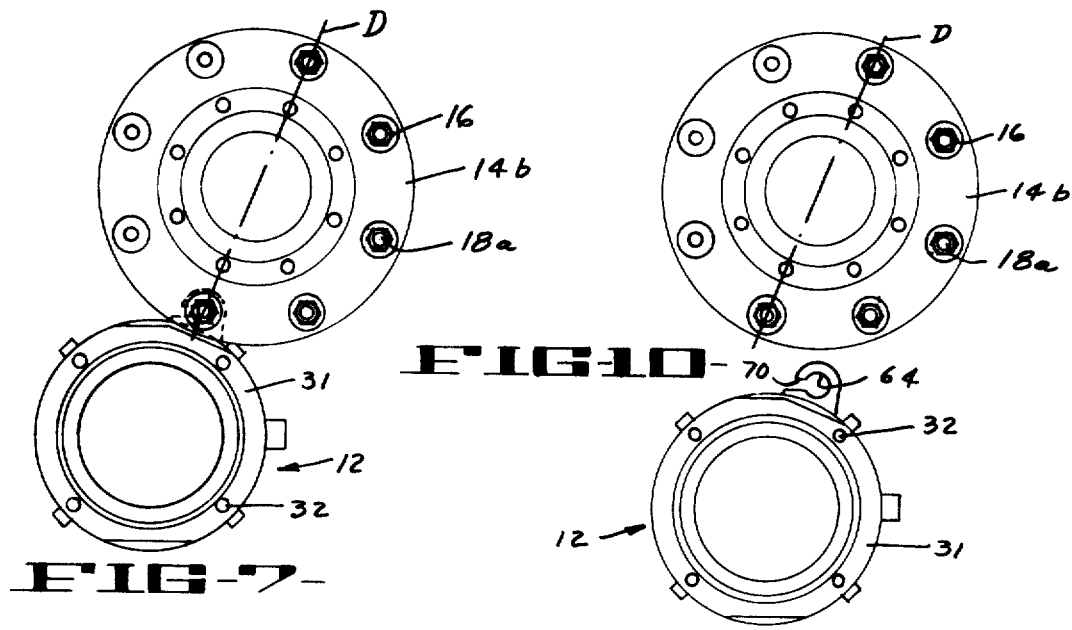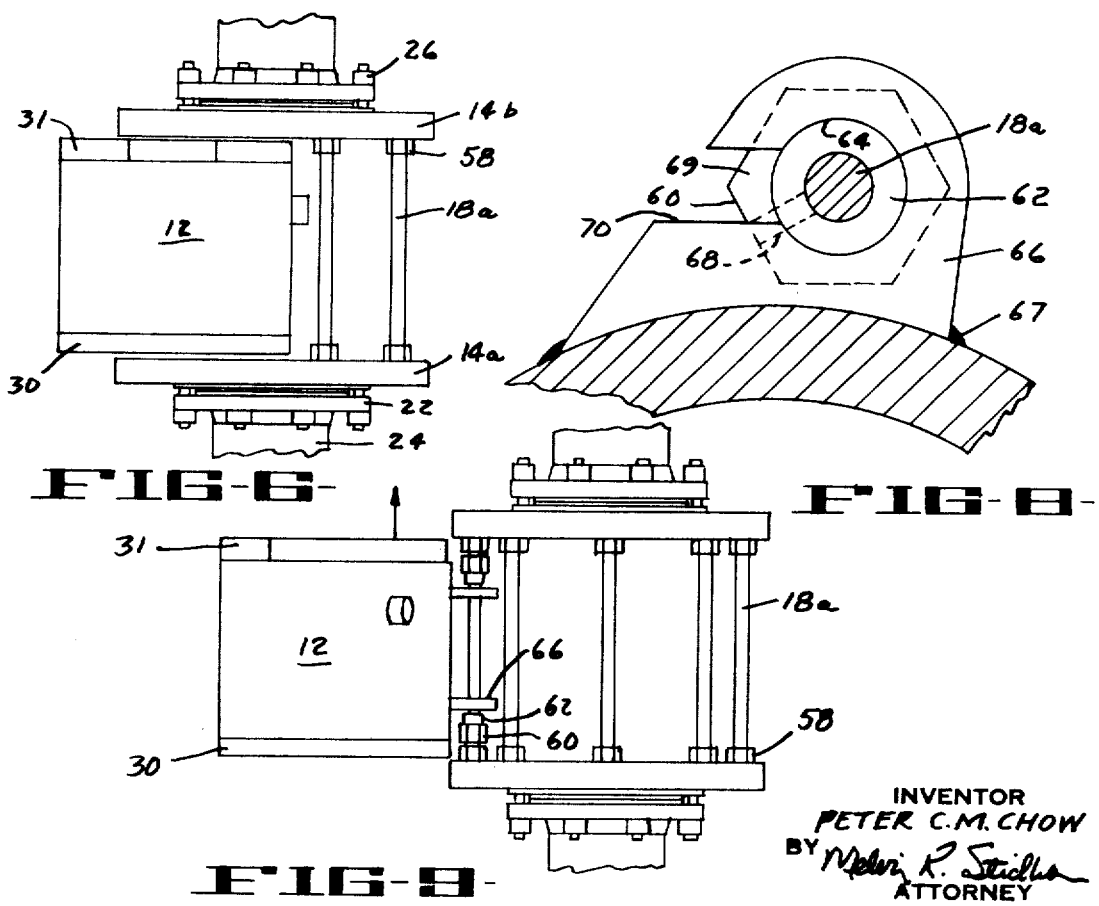

3,672,632

SWING OUT VALVE STRUCTURE

BACKGROUND OF THE INVENTION

This invention relates to a swing-out valve structure, and more particularly to a valve structure with a body that may be pivoted out of a pipeline for inspection of the interior.

Specifically, this application relates to valve structures of the type shown in U.S. Pat. No. 3,371,677 granted Mar. 5, 1968 to Walter L. Connolly. Such valve structures are of fabricated construction having a tubular body member clamped between end flange connector plates. Jacking nuts permit slight separation of the connector plates for lateral removal of the valve body, but this requires the use of a hoist or other lifting means and, for all practical purposes, requires complete separation of the valve body from the pipeline. Such valves are particularly difficult to remove from and replace in vertical lines where it would be highly desirable to move a valve out of containment in the line for visual inspection without requiring complete removal.

OBJECTS OF THE INVENTION

It is an object of this invention to provide a fabricated valve including a body section which may be pivoted out of alignment with a vertical pipeline.

It is a further object of this invention to provide a fabricated valve structure with a tubular body section which may be pivoted out of alignment with the pipeline or completely removed therefrom.

It is a further object of this invention to provide a valve structure with a body section which may be pivoted out of a pipeline without requiring the use of mechanical hoists.

Other objects and advantages of this invention will become apparent from the description following when read in conjunction with the accompanying drawing.

BRIEF SUMMARY OF THE INVENTION

In carrying out this invention, there is provided a tubular valve body with end closures which are secured to the valve body by screw means which are recessed below the surface. Line flange connector plates having tapped holes for connecting them into a pipeline are clamped against the end closures by nuts on studs which extend between them. On those studs which are located on, and on one side of, a given center line of the flow passages are provided with jacking nuts on the inside of the connector plates so that by tightening them, after loosening the clamping nuts, the connector plates are forced apart to permit removal of the valve body with end closures. A pair of hinge members, which are welded to the valve body have circular openings therein to rotatably receive portions of bushing members which are threaded onto a stud located on the aforesaid center line. Adjacent portions of the bushing are of larger cross section to engage the faces of the hinge members and function as thrust bearings. Hence, when those studs without jacking nuts are removed, and the connector plates separated a slight amount, the entire body section with closure plates may be pivoted out of the line for inspection of the interior. Slots in the hinge members which open into the circular openings permit complete removal of the valve body from the pivot stud after the bushings are threaded back out of engagement with the hinge members.

BRIEF DESCRIPTION OF THE DRAWINGS

FIG. 4 is an elevation view of the valve pivoted from its normal position;

FIG. 5 is a top view of the valve as shown in FIG. 4;

FIG. 6 is an elevation view of the valve fully pivoted from its normal position;

FIG. 7 is a top view of the valve as shown in FIG. 6;

FIG. 8 is an enlarged partial view of a hinge assembly;

FIG. 9 is an elevation view of the valve preparatory to complete removal; and,

FIG. 10 is a top view of the valve separated from the line flanges.

DESCRIPTION OF THE PREFERRED EMBODIMENT

Figure 1:
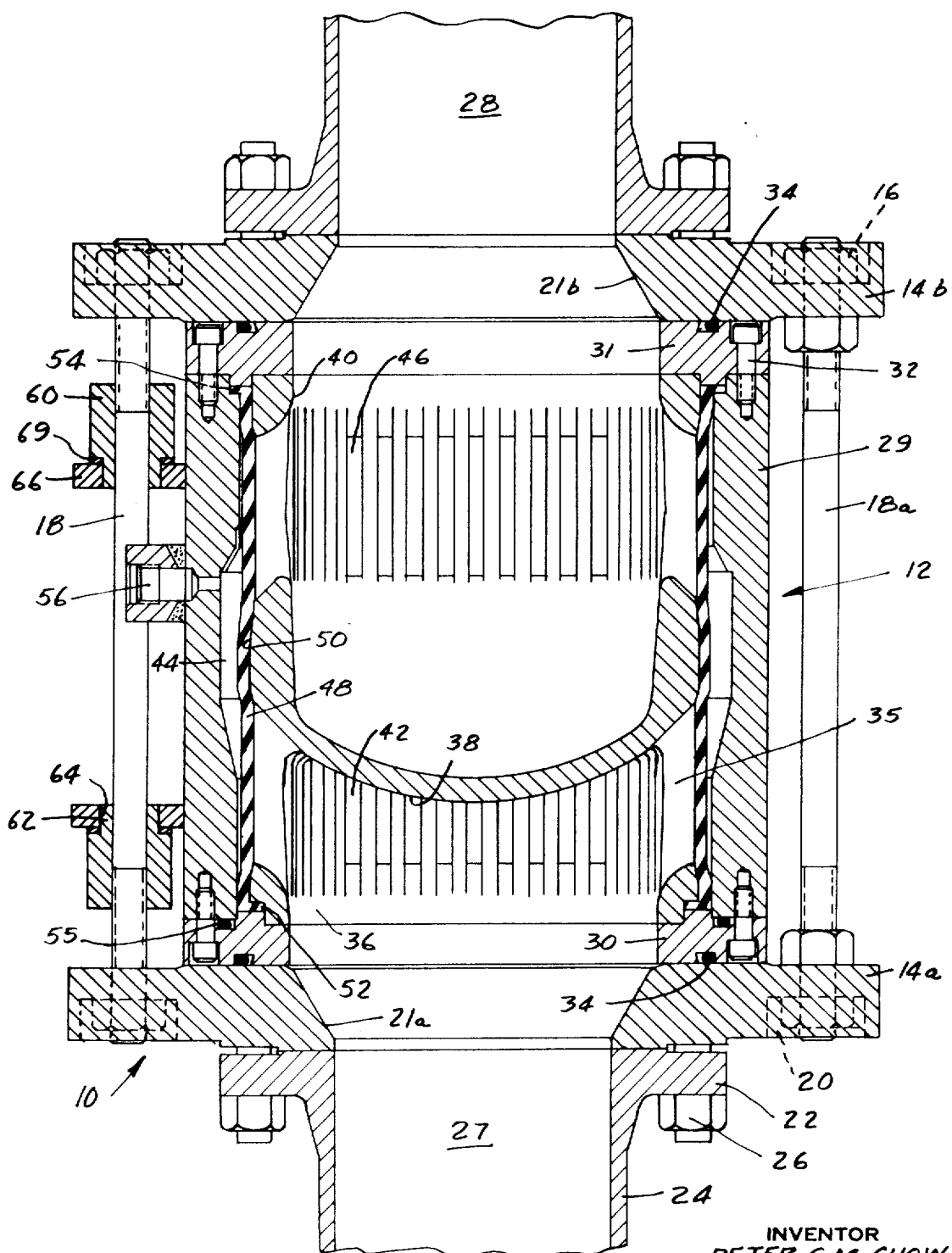
FIG. 1 is a vertical section view of a valve embodying features of this invention installed in a vertical pipeline.
Figure 3:
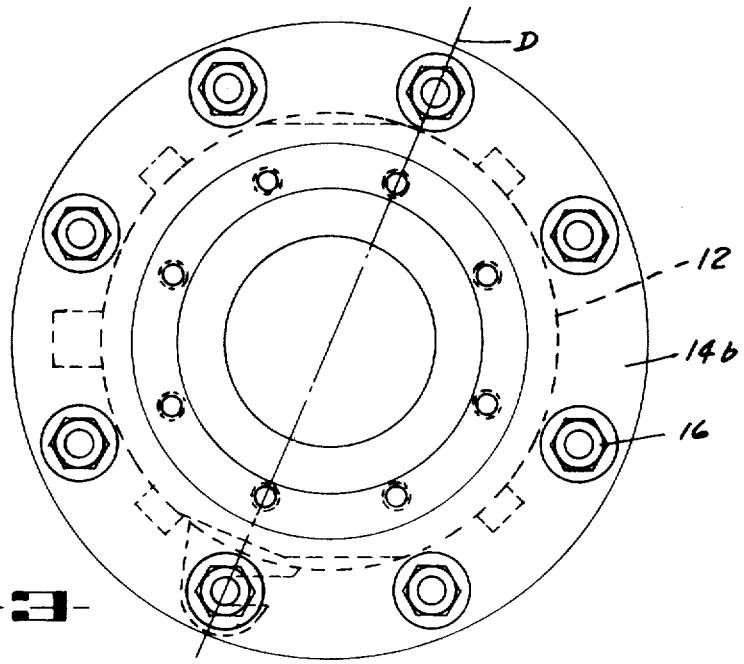
FIG. 3 is a top view of the valve as shown in FIG. 2.
Figure 2:
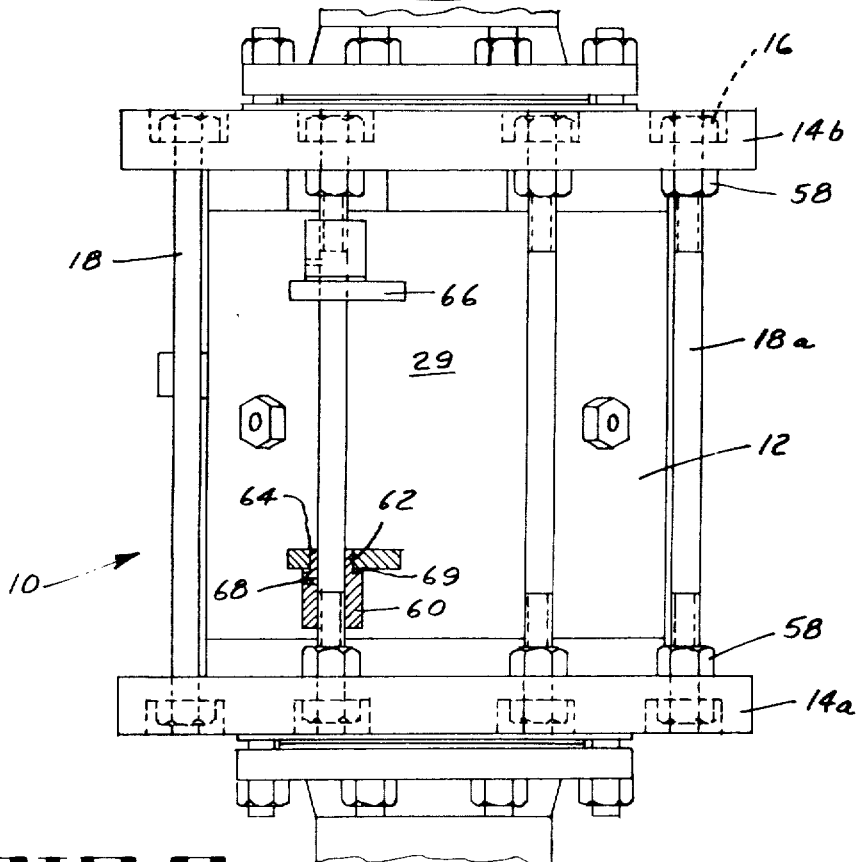
FIG. 2 is an elevation view of the valve in FIG. 1.

Referring now more particularly to FIG. 1, the valve 10 of this invention includes a swing out body section 12 which is clamped between a pair of line flange plates 14a and 14b by means of clamping nuts 16 on studs 18, 18a engaging in bottoms of recesses 20 on the line flanges 14a, 14b. The line flanges, with upstream and downstream flow passages 21a and 21b, are secured to complementary flanges 22 on the ends of pipeline sections 24 by means of screws 26, thus connecting the valve 10 to the upstream and downstream vertical lines 27 and 28.

While this invention is not restricted to any form of a valve, it is conveniently applied in connection with a flexible tube type valve of the type shown in the aforementioned U.S. Pat. No. 3,371,677. Accordingly, the swing out body 12 may include a generally cylindrical body tube 29 to which are screwed annular inlet and outlet plates 30 and 31 by means of cap screws 32 threaded into the ends of the body tube 29. With the swing out body 12 clamped in place between the line flanges 14a and 14b, suitable sealing means, such as O-rings 34, seal between them. Secured within the swing out body 12 is a core cage 35 having an inlet passage 36, an intermediate barrier 38 and an outlet passage 40. A plurality of inlet slots 42 may open into a transitional chamber 44 within the body tube 29 which in turn communicates with a series of outlet slots 46. A flexible sleeve 48 is stretched around the core 35 to seal against a generally cylindrical surface 50 around the central barrier 38. An inturned flange 52 at the inlet end of the tube 48 and an outturned flange 54 at the outlet end are clamped against the end plates 30 and 31. An O-ring 55 is provided to seal between the body tube 29 and the inlet end plate 30.

In operation, a fluid under pressure is introduced through fitting 56 from any suitable source, such as the upstream line 27, to balance the pressure in the upstream flow passage 36 whereby tension in the stretched sleeve 48 causes it to seal around the cylindrical surface 50 and prevent flow around the barrier 38. However, when this control pressure fluid is bled out of the chamber 44, the tension in the expansible sleeve 48 will be overcome by upstream pressure, permitting flow through the upstream slots 42 into the chamber 44, and then back in, through the downstream slots 46 to the outlet flow passage 28. Particularly because of the use of a resilient sleeve 48, which is subject to wear or puncture, as the principle valve component, it is highly desirable to be able to inspect the interior of the valve 10 without removing it from the line 24 and completely dismantling it. This invention facilitates such inspection.

Referring now more particularly to FIGS. 2 through 5, it will be noted that certain of the studs 18a are provided with a second pair of jacking nuts 58 which are adapted to engage the inner surface of the line flanges 14a and 14b. Hence, if the clamping nuts 16 are loosened slightly, the jacking nuts 58 may be tightened to separate the line flanges 14a and 14b by an amount sufficient to free the swing out body 12 of clamping engagement and to permit some lateral movement thereof. It will be noted particularly in FIGS. 4 and 5 that the studs 18a which are provided with jacking nuts 58 are situated on, and on one side of diameter D of the flow passage 28, whereby the jacking forces against the line flanges 14a and 14b actually act on both sides of the diameter D whereby the flanges are separated in parallel relationship, and not jacked askew.

Threaded onto one of the studs 18a located on the center line D is a pair of bushings 60 having opposed reduced diameter portions 62 (FIGS. 2 and 8) which rotatably receive circular openings 64 in hinge members 66 which are welded at 67 at the outer surface of the body tube 29. When the bushings 60 are threaded along the stud 18 to protrude into the circular opening 64, set screws 68 may be tightened to hold them in place. Thrust washers 69 carried on the bushings 60 engage the hinge members to function as thrust bearings and support the load of the swing out body portion 12. Hence, after the clamping nuts 16 have been loosened and the jacking nuts 58 tightened to separate the line flanges 14a and 14b, the entire body 12 may be pivoted from the line flanges 22 after the remaining studs 18 have been removed, as shown in FIGS. 4 and 5.

As further shown in FIGS. 6 and 7, the swing out body 12 may be completely pivoted through 180° providing clear access to the interior of the valve 10 for inspection and limited repair. Moreover, with the body 12 fully pivoted, an operator has access to the cap screws 32 whereby the top end plate 31 may be removed to repair or replace internal components of the swing out body 12. Should it be desired to remove the swing out body 12 completely from the line 24, the valve body may be supported by any suitable means as indicated by the arrow in FIG. 9, and the bushings threaded back out of engagement with the hinge members 66. A slot 70 is formed in the hinge members of a width slightly greater than the diameter of the studs 18a. Hence, with the bushings 60 backed out of engagement from the circular bearing openings 64, the body 12 may be completely separated for repair or replacement as shown in FIG. 10.

While this invention has been described in conjunction with the preferred embodiment thereof, it is obvious that modifications and changes therein may be made by those skilled in the art without departing from the spirit and scope of this invention.

What is claimed is:

1. A valve structure comprising:
   a valve body having a flow passageway therethrough,
   a pair of end connector plates having flow openings therethrough,
   means on the outer faces of said connector plates for connecting them to pipe sections,
   a plurality of aligned openings around the edges of said connector plates,
   a plurality of elongated threaded studs extending between said connector plates and through said aligned openings,
   a plurality of clamping nuts carried on said studs to bear against the outer surfaces of said connector plates,
   a plurality of jacking nuts carried on certain of said studs on, and on one side of, a given diameter of said flow openings and movable into engagement with the inner surfaces of said connector plates to impart separating forces thereto,
   the elongated studs other than said certain studs, when removed, leaving sufficient space for passage of said valve body, transversely between said connector plates,
   said certain studs and said jacking nuts being of sufficient strength to hold said connector plates in spaced relationship against forces transmitted by a pipeline,
   the improvement comprising:
   hinge members secured to said valve body, and
   means operatively associated with one of said certain studs located on said given diameter for forming a rotatable connection between said hinge member and said certain stud, said rotatable connection means further preventing axial movement of said hinge member along said one certain stud.

2. The valve structure defined by claim 1 wherein said hinge member comprises:
   a lug secured to said valve body, and
   a circular hole through said lug,
   and said rotatable connection comprises:
   a bushing threadedly received on said one stud,
   said bushing being of an external diameter along a portion of its length to be rotatably received in said circular hole and being of a larger cross section adjacent said portion to take axial thrust from said lug.

3. The valve structure defined by claim 2 including:
   a lateral slot in said lug opening into said circular hole,
   said lug being disengageable from said one stud through said slot when said bushing is threaded out of said circular hole.

4. The valve structure defined by claim 2 including:
   a thrust washer interposed between said lug and said portion of larger cross section.

5. The valve structure defined by claim 1 wherein said hinge member comprises:
   a pair of spaced lugs secured to said valve body, and
   a circular hole through each of said lugs,
   and said rotatable connection comprises:
   a pair of bushings threadedly received on said one stud, on remote sides of said lugs,
   said bushings being of an external diameter along corresponding portions of their length to be rotatably received in said circular holes, and being of a larger cross section adjacent said portions to take axial thrust from said lug.

* * * * *